(12) United States Patent
Bhat

(10) Patent No.: US 11,906,314 B2
(45) Date of Patent: Feb. 20, 2024

(54) SYSTEM FOR WAYPOINT SELECTION AND METHOD OF USING

(71) Applicant: NEC Corporation, Tokyo (JP)

(72) Inventor: Akhilesh Prashant Bhat, Tokyo (JP)

(73) Assignee: NEC CORPORATION, Tokyo (JP)

( * ) Notice: Subject to any disclaimer, the term of this patent is extended or adjusted under 35 U.S.C. 154(b) by 55 days.

(21) Appl. No.: 17/472,523

(22) Filed: Sep. 10, 2021

(65) Prior Publication Data

US 2023/0085055 A1    Mar. 16, 2023

(51) Int. Cl.
*G01C 21/34* (2006.01)
*B25J 9/16* (2006.01)

(52) U.S. Cl.
CPC ........ *G01C 21/3469* (2013.01); *B25J 9/1666* (2013.01); *G01C 21/3415* (2013.01)

(58) Field of Classification Search
CPC ............ G01C 21/3469; G01C 21/3415; G01C 21/20; G01C 21/343; B25J 9/1666; G05D 1/02
See application file for complete search history.

(56) References Cited

U.S. PATENT DOCUMENTS

| | | | |
|---|---|---|---|
| 2019/0080266 A1 | 3/2019 | Zhu et al. | |
| 2020/0097014 A1 | 3/2020 | Wang | |
| 2021/0095976 A1 | 4/2021 | Sarkar et al. | |
| 2021/0142680 A1 | 5/2021 | Saunders | |
| 2021/0178590 A1* | 6/2021 | Mao | B25J 9/1666 |
| 2022/0073101 A1* | 3/2022 | Wang | G01C 21/343 |
| 2022/0276654 A1* | 9/2022 | Lee | G05D 1/0274 |

(Continued)

FOREIGN PATENT DOCUMENTS

| | | |
|---|---|---|
| CN | 113359776 A | 9/2021 |
| EP | 2042963 A2 | 4/2009 |

(Continued)

OTHER PUBLICATIONS

H. Choset et al. "Theory, Algorithms, and Implementations, Potential Field Methods", MIT Press, Boston, 2005, 20pp.

(Continued)

*Primary Examiner* — Anne Marie Antonucci
*Assistant Examiner* — Patrick Daniel Mohl
(74) *Attorney, Agent, or Firm* — HAUPTMAN HAM, LLP

(57) ABSTRACT

A waypoint selection system includes a non-transitory computer readable medium configured to store instructions thereon; and a processor connected to the non-transitory computer readable medium. The processor is configured to execute the instructions for obtaining information related to a current pose of a vehicle; obtaining a plurality of waypoints between the current pose and a destination pose; and receiving obstacle information. The processor is configured to execute the instructions for determining a first waypoint cost for a first waypoint of the plurality of waypoints. The processor is configured to execute the instructions for selecting the first waypoint in response to the first waypoint cost satisfying a predetermined condition. The processor is configured to execute the instructions for outputting the selected first waypoint and all waypoints of the plurality of waypoints between the first waypoint and the current pose to a controller in response to selecting of the first waypoint.

15 Claims, 9 Drawing Sheets

(56) References Cited

U.S. PATENT DOCUMENTS

2022/0342421 A1* 10/2022 Kearns ................ G05D 1/0214
2022/0388170 A1* 12/2022 Merewether ............ B25J 9/162

FOREIGN PATENT DOCUMENTS

| EP | 3306431 A1 | 4/2018 |
|---|---|---|
| JP | 200925974 A | 2/2009 |
| JP | 2018151328 A | 9/2018 |

OTHER PUBLICATIONS

D. Fox et al., "The Dynamic Window Approach to Collision Avoidance", IEEE Robotics & Automation Magazine, 1997, pp. 23-33, 11pp.
J. A. Reeds et al., "Optimal Paths for a Car That Goes Both Forwards and Backwards", Pacific Journal of Mathematics, 1990, pp. 367-393, vol. 145, No. 2, 27pp.
Steven M. Lavalle, "Planning Algorithms", 2006, Cambridge University Press, 1023pp.
International Search Report in PCT Application No. PCT/JP2022/026736, dated Sep. 20, 2022, 3pp.

* cited by examiner

SYSTEM FOR WAYPOINT SELECTION AND METHOD OF USING

BACKGROUND

Determining route for robots of vehicles to move from one location to another includes plotting waypoints between an initial location and a destination location. A waypoint is an intermediate position where the robot or vehicle is expected to pass through while moving from the initial location to the destination location.

Planning of the route includes use of both global planning aspects and local planning aspects. Global planning aspects include determining the destination location and identifying waypoints between the initial location and the destination local. Local planning aspects include planning a route from the initial location to an intermediate waypoint determined during the global planning. Using the global and local planning aspects permits the robot or vehicle to move autonomously, or with minimal user control, from the initial location to the destination location.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
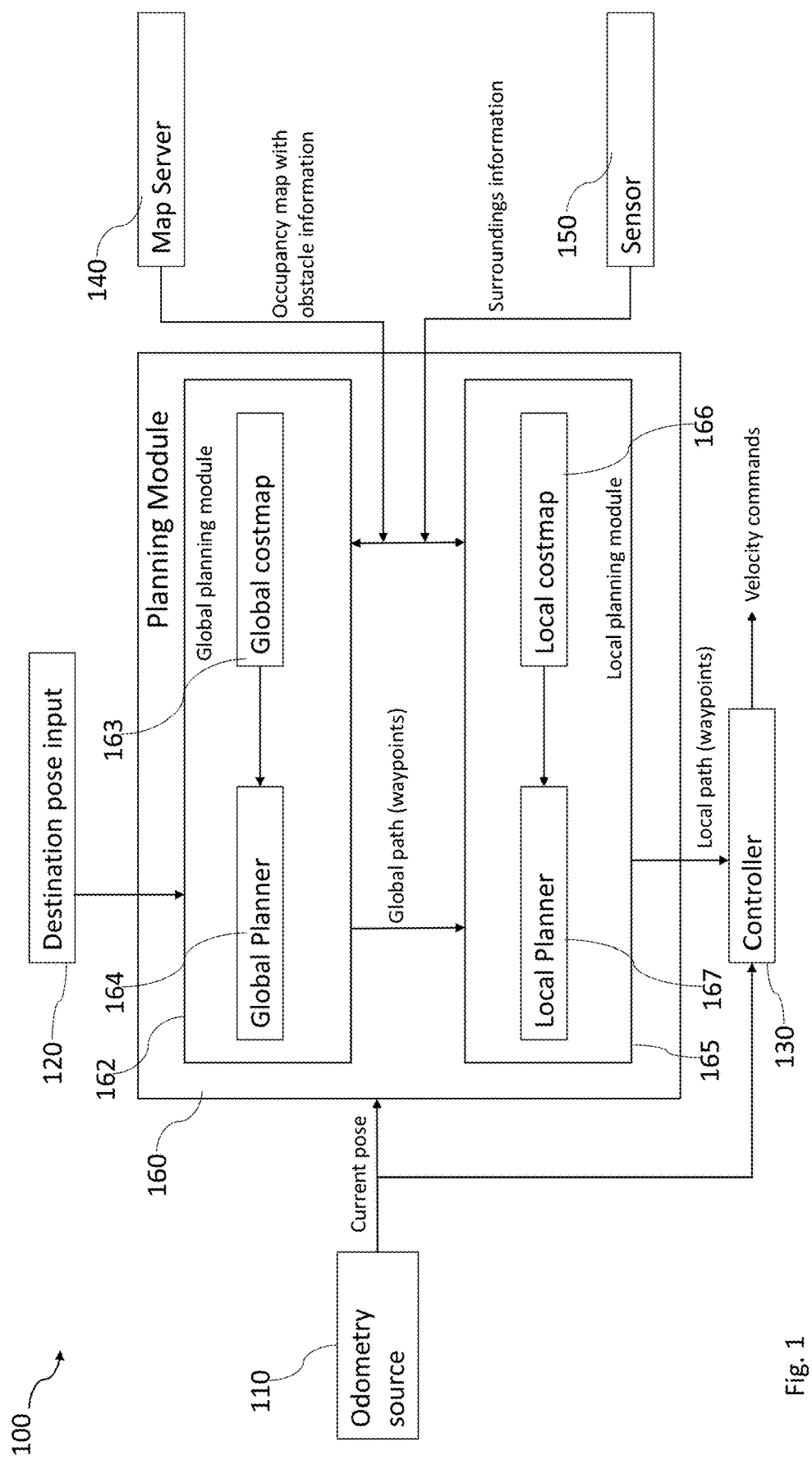
FIG. 1 is a block diagram of a route determining system in accordance with some embodiments.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly. Use of the term "and/or" means that each option is usable individually or in combination with any, or all, of the other options.

The following description is applicable to any non-holonomic robot or vehicle. A non-holonomic robot or vehicle includes a robot or vehicle that cannot turn in a single spot, i.e., a turning radius is greater than zero. The following description will refer to vehicle for the sake of brevity, but one of ordinary skill would understand that the current description is applicable to any non-holonomic robot or vehicle. The current description is also applicable to autonomous driving applications.

Global planning of a route for a vehicle from an initial location to a destination location includes identification of waypoints along an estimated global path. Local planning includes selecting one of the identified waypoints and determining a route from the initial location to the selected waypoint. Selection of the waypoint for local planning of a route impacts efficiency of movement of the vehicle in reaching the destination location. For example, if the selected waypoint is very close to the initial location, the vehicle will change directions numerous times in order to reach the selected waypoint, in some instances. This changing of direction will increase travel time and reduce efficiency of movement. If the selected waypoint is far away from the initial location a risk of obstacles between the initial location and the selected way point increases, which increases processing load to determine a route which avoids a higher number of obstacles, in some instances. Therefore, selection of a waypoint which helps to maximize efficiency of movement or provides at least a predetermined threshold for efficiency of movement helps maximize efficiency of movement for the vehicle to reach the destination location.

Efficiency of movement for the vehicle helps to reduce power consumption by the vehicle. For example, where the vehicle is an electric vehicle (EV), battery life of the vehicle is improved as efficiency of movement is improved. In some embodiments, the vehicles includes an engine. Increasing efficiency of movement reduces fuel consumption by a vehicle including an engine. Using a forklift in a warehouse as an example, efficiency of movement helps to improve stocking or distribution processes within the warehouse, which in turn increases productivity in a logistics operation.

FIG. 1 is a block diagram of a route determining system 100 in accordance with some embodiments. The route determining system 100 is usable to determine a route for a vehicle to travel from the initial location to the destination location. In addition, to traveling from the initial location to the destination location, the route determining system 100 is also able to plan movements of the vehicle so that the vehicle has a desired orientation upon reaching the destination location. For example, a forklift in a warehouse should not just reach the destination location on a shelf for retrieving a product, but should also be facing the shelf at the destination location in order to increase efficiency of movement.

The route determining system 100 includes an odometry source 110 configured to determine an initial pose. A pose is a combination of location and orientation relative to a reference axis. In some embodiments, the odometry source 110 is also configured to determine a current velocity of the vehicle. In some embodiments, the odometry source 110 includes at least one sensor, such as an accelerometer, a gyroscope, or another suitable sensor, attached to the vehicle. In some embodiments, the odometry source 110 is implemented by a device external to the vehicle that detects the pose of the vehicle. For example, in some embodiments, a remote sensor, such as a camera, a light detection and ranging (LiDAR), or other suitable remote sensor, is used to monitor the vehicle and the pose of the vehicle is determined using a processor connected to the remote sensor. The odometry source 110 is configured to output the current pose of the vehicle to a controller 130 and to a planning module 160. In some embodiments, the current pose is provided to the planning module 160 and the controller 130 independently either wirelessly or by a wired connection.

The route determining system 100 further includes a destination pose input 120. The destination pose input 120 includes the destination location and desired orientation of the vehicle at the destination location. In some embodiments, the destination pose is received from a user, e.g., through a graphical user interface (GUI) or another suitable input/output (I/O) device. In some embodiments, the destination pose is determined by an external device, e.g., a processor, configured to determine tasks for the vehicle. The destination pose input 120 is provided to the planning module 160. The destination pose input 120 is provided to the planning module 160 either wirelessly or by a wired connection.

The route determining system 100 further includes a controller 130 configured to provide commands to the vehicle. In some embodiments, the controller 130 is included as part of the vehicle. In some embodiments, the controller 130 is external to the vehicle. In some embodiments, the controller 130 includes a cloud based controller implemented using one or more servers. The controller 130 is configured to receive a local path and waypoints from the planning module 160 as well as the current pose from the odometry source 110. Based on the local path and waypoints, the controller 130 is configured to determine which movements the vehicle should perform to change from the current pose to a destination pose at the destination location or at a selected waypoint. The controller 130 is configured to provide commands for both speed and direction of movement for the vehicle. In some embodiments, the controller 130 is configured to provide the commands to the vehicle wirelessly. In some embodiments, the controller 130 is configured to provide the commands to the vehicle using a wired connection. In some embodiments, the controller 130 is configured to receive the local path and waypoints wirelessly. In some embodiments, the controller 130 is configured to receive the local path and waypoints via a wired connection.

The route determining system 100 further includes a map server 140 configured to store obstacle information and pathway locations. In some embodiments, the map server 140 is included in a memory connected to the vehicle. In some embodiments, the map server 140 is external to the vehicle, such as a cloud-based storage unit. The map server 140 includes information on known locations of obstacles. In some embodiments, the map server 140 is updated based on new information from the vehicle and other vehicles as new obstacles are identified or locations of obstacles change. In some embodiments, the map server 140 includes information on pathways, such as roads, aisles in a warehouse, hallways in a building or other suitable pathways, along which the vehicle is able to travel. In some embodiments, the map server 140 further includes information related to locations of other vehicles connected to the map server 140. The map server 140 is configured to provide the obstacle information and pathway locations to the planning module 160. In some embodiments, the map server 140 transmits the obstacle information and pathway locations wirelessly. In some embodiments, the map server 140 transmits the obstacle information and pathway locations via a wired connection. In some embodiments, the map server 140 is also connected to the controller 130 in order to exchange information with the controller 130, either wirelessly or by wired connection.

The route determining system 100 further includes a sensor 150 configured to detect obstacles near the vehicle. In some embodiments, the sensor 150 is a single sensor. In some embodiments, the sensor 150 includes a plurality of sensors. In some embodiments, the sensor 150 includes sensors of different types. In some embodiments, the sensor 150 is within the vehicle. In some embodiments, the sensor 150 is external to the vehicle. In some embodiments, the sensor 150 is integrated with the odometry source 110. In some embodiments, the sensor 150 includes a camera, LiDAR, or another suitable sensor. The sensor 150 is configured to provide information, e.g., point cloud data, laser scan data, or other suitable data, related to the surroundings of the vehicle to the planning module 160. In some embodiments, the sensor 150 provides the surroundings information to the planning module 160 wirelessly. In some embodiments, the sensor 150 provides the surroundings information to the planning module 160 via a wired connection.

The route determining system 100 further includes a planning module 160. The planning module 160 is configured to receive the current pose from the odometry source 110; the destination pose input 120; the obstacle information and pathway locations from the map server 140; and the surroundings information from the sensor 150. The planning module 160 is configured to use the received information to determine a local path and waypoints between the current pose and the destination pose. The planning module 160 is configured to output the local path and waypoints to the controller 130 either wirelessly or through a wired connection. The planning module 160 is implemented using one or more processors. In some embodiments, the planning module 160 is part of the vehicle. In some embodiments, the planning module 160 is external to the vehicle.

The planning module 160 includes a global planning module 162. The global planning module 162 is configured to determine a global waypoints from the current pose to the destination pose. The global planning module 162 includes a global costmap 163. The global cost map 163 is configured to determine which portions of a map between the current pose and the destination pose are traversable by the vehicle. The global planning module 162 further includes a global planner 164 configured to determine waypoints from the current pose to the destination pose based on the information from the global costmap 163 along with the information received by the planning module 160. The global planner 164 is configured to set a location for waypoints. In some embodiments, the global planner 164 is configured to set a waypoint at regular intervals between the current pose and the destination pose. In some embodiments, the global planner 164 is configured to set a waypoint at a predetermined distance from known obstacle locations between the current pose and the destination pose. The global costmap 163 and the global planner 164 are implemented by one or more processors. In some embodiments, the global costmap 163 and the global planner 164 are implemented by a same processor. In some embodiments, the global costmap 163 and the global planner 164 are implemented using separate processors.

The planning module 160 further includes a local planning module 165. The local planning module 164 is configured to determine a local path and waypoints from the current pose to a pose at a selected waypoint received from the global planning module 162. The local planning module 165 includes a local costmap 166. The local cost map 166 is configured to determine which portions of the map between the current pose and the pose at the selected waypoint are traversable by the vehicle. Details of determining the amount of movement are discussed in detail below, in accordance with some embodiments. The local planning module 165 further includes a local planner 167 configured to determine a path from the current pose to the pose at a selected waypoint based on the information from the local costmap 166, the information from the global planning module 162, and the information received by the planning module 160. The local planner 167 is configured to set waypoints along the determined path. The local costmap 166 and the local planner 167 are implemented by one or more processors. In some embodiments, the local costmap 166 and the local planner 167 are implemented by a same processor. In some embodiments, the local costmap 166 and the local planner 167 are implemented using separate processors. In some embodiments, at least one of the local costmap 166 or the local planner 167 is implemented using a same processor as at least one of the global costmap 163 or the global planner 164. In some embodiments, all of the local costmap 166, the local planner 167, the global costmap 163 and the global planner 164 are implemented using separate processors.

Figure 2:
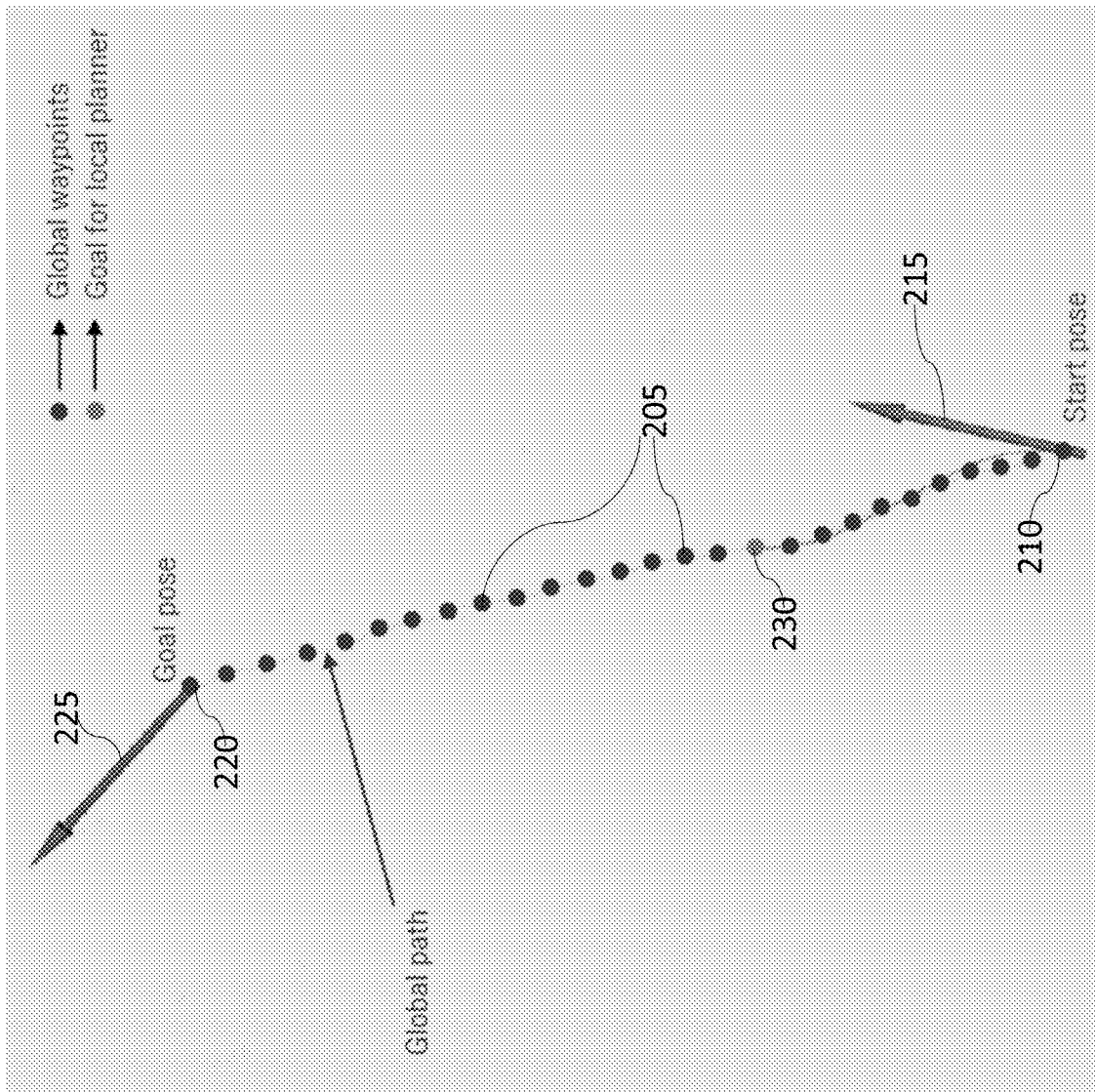
FIG. 2 is a schematic view of a route including waypoints in accordance with some embodiments.

FIG. 2 is a schematic view of a route 200 including waypoints 205 in accordance with some embodiments. In some embodiments, the route 200 is a global path provided by a global planning module, e.g., the global planning module 162 (FIG. 1), to a local planning module, e.g., the local planning module 165 (FIG. 1). The route 200 includes an initial location 210 and an initial orientation 215, which together define an initial pose. The route 200 further includes a destination location 220 and a destination orientation 225, which together define a destination pose. Between the initial location 210 and the destination location 220 are a plurality of waypoints 205. A waypoint 230 is a waypoint among the plurality of waypoints 205 selected by a local planner, e.g., by the local planner 167 (FIG. 1), for determining a local path starting from the initial pose.

Based on the route 200, a local planner, e.g., the local planner 167 (FIG. 1), will determine a local path from the initial pose to the waypoint 230 and having an orientation designated at the waypoint 230. In response to receiving the local path and the waypoints 205 between the waypoint 230 and the initial pose, a controller, e.g., the controller 130 (FIG. 1), will generate and provide instructions to a vehicle for moving from the initial pose to the pose at the waypoint 230. Details for how the local costmap selects a waypoint, such as waypoint 230, are provided below, in accordance with some embodiments.

Figure 3:
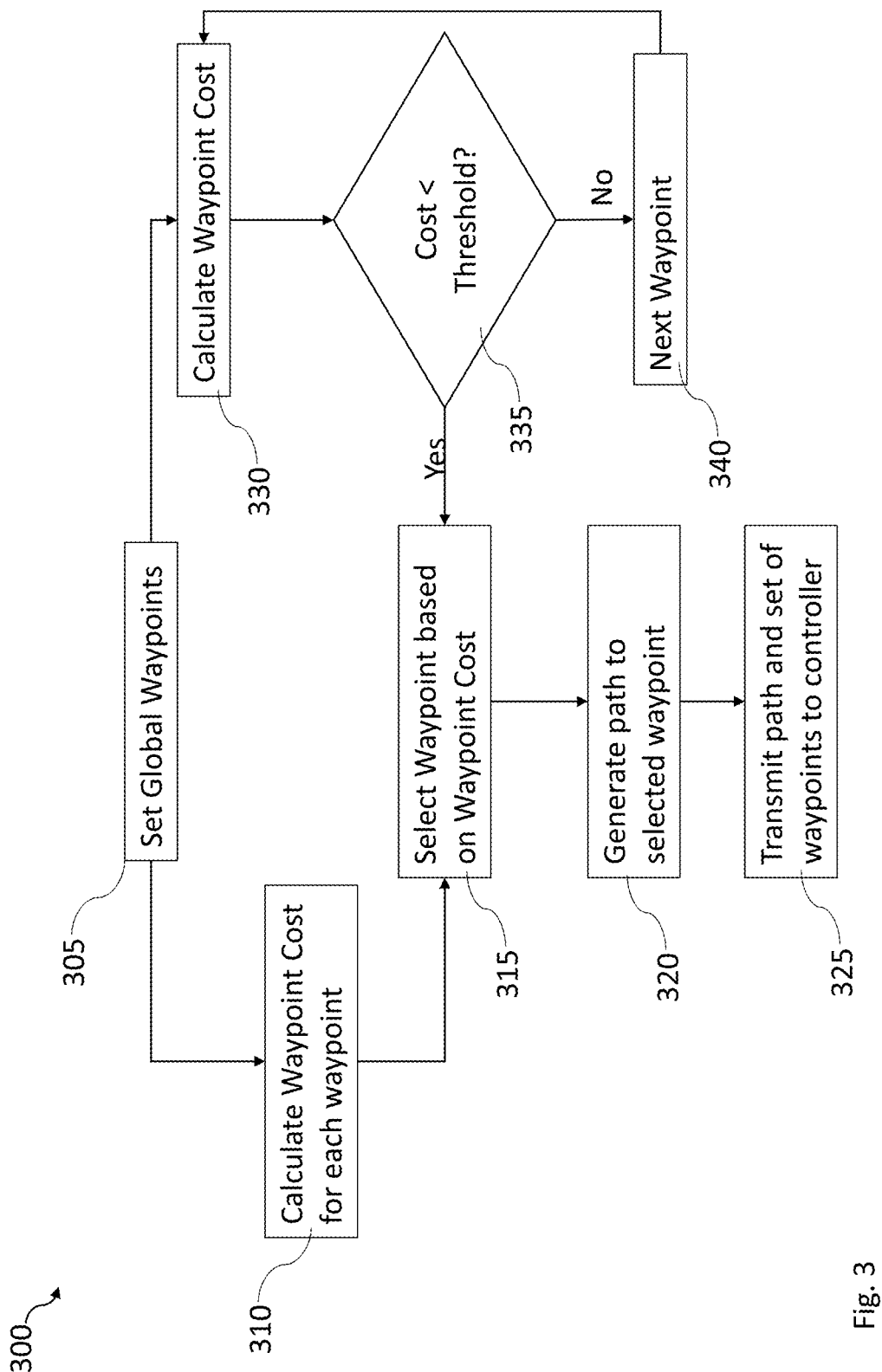
FIG. 3 is a flowchart of a method of selecting a waypoint in accordance with some embodiments.

FIG. 3 is a flowchart of a method 300 of selecting a waypoint in accordance with some embodiments. The method 300 is usable to generate a local path, e.g., a local path between the initial pose and the pose at waypoint 230 (FIG. 2). In some embodiments, the method 300 is implemented using a route determining system 100 (FIG. 1).

The method 300 includes an operation 305, in which global waypoints are set. The global waypoints are set based on a current pose, a destination pose, map data and sensor data. In some embodiments, the current pose is provided by an odometry sensor, e.g., odometry sensor 110 (FIG. 1). In some embodiments, the destination pose is provided by a destination pose input, e.g., destination pose input 120 (FIG. 1). In some embodiments, the map data is provided by a map server, e.g., map server 140 (FIG. 1). In some embodiments, the sensor data is provided by a sensor, e.g., sensor 150 (FIG. 1). Based on the received information a global path is determined for a vehicle to travel from the current pose to the destination pose. In some embodiments, the global path is determined using a global planner, e.g., global planner 164 (FIG. 1). Global waypoints are set along the global path. In some embodiments, the global waypoints are set at regular intervals along the global path. In some embodiments, the global waypoints are set at predetermined distance from known obstacle locations between the current pose and the destination pose.

Following operation 305, the method 300 proceeds to either operation 310 or operation 330. The method 300 proceeding to operation 310 provides a more precise result in comparison with the method 300 proceeding to operation 330. However, the method 300 proceeding to operation 310 includes a higher processing load in comparison with the method 300 proceeding to operation 330. In some embodiments, a selection of whether to proceed to operation 310 or operation 330 is based on a user input. In some embodiments, whether to proceed to operation 310 or operation 330 is determined based on a state of charge (SOC) of the vehicle. In embodiments where the method 300 proceeds according to the SOC of the vehicle, the method 300 proceeds to operation 330 in response to the SOC of the vehicle being below a predetermined threshold.

In operation 310, a waypoint cost is calculated, e.g., using local costmap 166 (FIG. 1), for each waypoint of the global waypoints. Calculation of the waypoint cost is described in detail below. In some embodiments, operation 310 is limited to only waypoints equal to or less than halfway between the initial location, determined using the current pose, and the destination location, determined using the destination pose. In some embodiments, operation 310 is limited to only waypoints more than 10% of a distance along the global path from the current pose.

In operation 330, a waypoint cost is calculated, e.g., using local costmap 166 (FIG. 1), for a first waypoint of the global waypoints. Calculation of the waypoint cost is described in detail below. In some embodiments, the first waypoint is the global waypoint closest to the current pose. In some embodiments, the first waypoint is the global waypoint closes to the destination pose. In some embodiments, the first waypoint is the global waypoint closest to a middle of the global path between the current pose and the destination pose. In some embodiments, the first waypoint is designated by the user. In some embodiments, the first waypoint is randomly selected from among the global waypoints.

In operation 335, the waypoint cost determined in operation 330 is compared, e.g., using local planner 167 (FIG. 1), against a waypoint cost threshold value. The waypoint cost threshold value is a predetermined value set based on a user input, a SOC of the vehicle, regulations set by a third party, such as a company or government, or another suitable criteria. In response to a determination that the waypoint cost is less than the waypoint cost threshold value, the method 300 proceeds to operation 315. In response to a determination that the waypoint cost is equal to or greater than the waypoint cost threshold value, the method 300 proceeds to operation 340.

In operation 340, the waypoint is moved to a next waypoint, e.g., a second waypoint, of the global waypoints, e.g., using local costmap 166 (FIG. 1). In some embodiments, the next waypoint is one waypoint closer to the current pose than a last waypoint compared to the waypoint cost threshold value. In some embodiments, the next waypoint is one waypoint closer to the destination pose than the last waypoint compared to the waypoint cost threshold value. In some embodiments, the next waypoint is selected randomly from all remaining global waypoints that have not been compared to the waypoint cost threshold value. Following operation 340, the method 300 returns to the operation 330 and the cost of the next waypoint determined in operation 340 is calculated in the operation 330. The operations 330, 335 and 340 repeat until a waypoint is found to have a cost less than the waypoint cost threshold value. In response to a comparison between the waypoint cost for every global waypoint and the waypoint cost threshold value failing to identify a global waypoint satisfying the condition of operation 335, the method 300 returns to operation 310. One of ordinary skill in the art would understand that the waypoint cost for every global waypoint has already been calculated based on the failure of operations 330, 335 and 340 to find any global waypoint having a waypoint cost less than the waypoint cost threshold value. Therefore, once the method 300 returns to operation 310, the method is able to then proceed immediately to operation 315.

In operation 315, a global waypoint having a lowest waypoint cost is selected for use by a local planner, e.g., local planner 167 (FIG. 1), to develop a local path. In some embodiments where the method 300 proceeds from operation 335 directly to operation 315, the global waypoint most recently compared to the waypoint cost threshold value is selected for use by the local planner.

In operation 320, a path to the selected waypoint from the current pose is generated. In some embodiments, the path is generated using the local planner, e.g., local planner 167 (FIG. 1). The path is generated based on map data, e.g., from map server 140 (FIG. 1), the current pose, e.g., from odometry source (110), sensor data, e.g., from sensor 150 (FIG. 1), and the selected waypoint.

In operation 325, the generated path and set of waypoints between the current pose and the selected waypoint are transmitted to a controller for directing the vehicle to the selected waypoint. In some embodiments, instructions for transmitting the generated path and set of waypoints are generated by the local planner, e.g., local planner 167 (FIG. 1). In some embodiments, the path and waypoints are transmitted wirelessly to the controller. In some embodiments, the path and waypoints are transmitted by a wired connection to the controller. The controller, e.g., controller 130 (FIG. 1) uses the generated path and the set of waypoints to provide velocity commands to the vehicle either wirelessly or using a wired connection.

The method 300 is repeated until the selected waypoint corresponds to the destination pose. In some embodiments, the method 300 repeats once a waypoint is selected and the controller begins directing the vehicle to the selected waypoint. In some embodiments, the method 300 is repeated once the vehicle is within a predetermined distance of the selected waypoint. In some embodiments, the method 300 is repeated once the vehicle is within a predetermine time of arrival to the selected waypoint. In some embodiments, the method 300 is repeated continuously while the vehicle is traveling from the current pose to the destination pose until the destination pose becomes the selected waypoint.

In some embodiments, at least one additional operation is included in the method 300. For example, in some embodiments, some of the global waypoints are excluded from waypoint cost calculation based on a proximity to the current pose in order to reduce processing load. In some embodiments, at least one operation is excluded from the method 300. For example, in some embodiments, the operations 330, 335 and 340 are excluded and the waypoint cost is calculated for each of the global waypoints regardless of user input or SOC of the vehicle.

Figure 4:
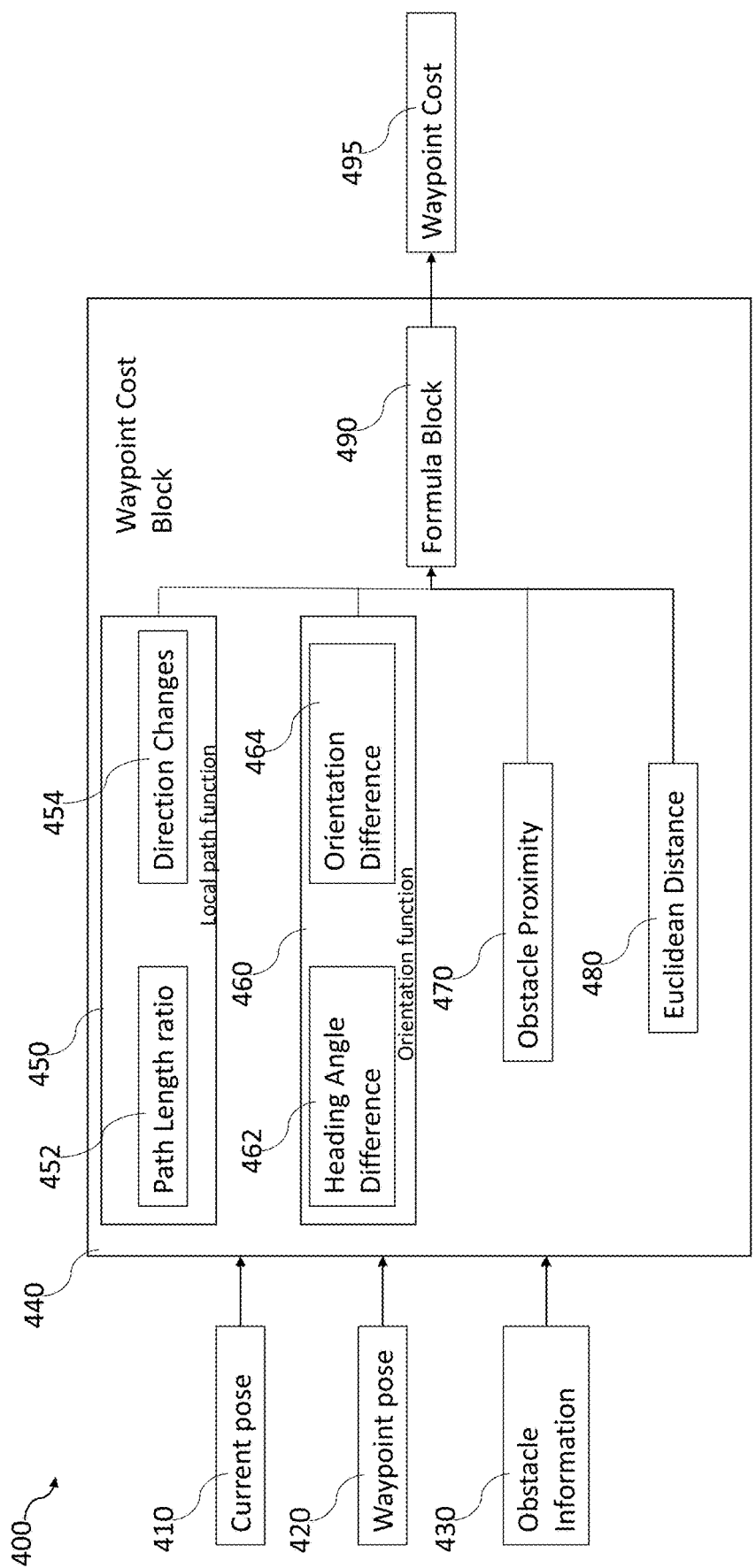
FIG. 4 is a block diagram of a waypoint selection system in accordance with some embodiments.

FIG. 4 is a block diagram of a waypoint selection system 400 in accordance with some embodiments. The waypoint selection system 400 is configured to determine a waypoint cost for a waypoint from a current pose. In some embodiments, the waypoint selection system 400 is usable to implement operation 310 and/or operation 330 in the method 300 (FIG. 3). The waypoint selection system 400 is implemented using one or more processors and is configured to exchange information. In some embodiments, the waypoint selection system 400 is incorporated into local costmap 166 (FIG. 1). The waypoint selection system 400 is configured to output a waypoint cost 495 to a local planner, e.g., local planner 167 (FIG. 1), either wirelessly or using a wired connection. The waypoint selection system 400 is further configured to receive information from external devices either wirelessly or using a wired connection The waypoint selection system 400 includes a waypoint cost block 440 configured to determine a waypoint cost for a waypoint under consideration. The waypoint cost corresponds to an amount of movement for the vehicle to move from the current pose to a waypoint pose corresponding to the waypoint under consideration. The waypoint cost block 440 is configured to receive a current pose 410. The current pose is a current position and orientation of the vehicle. In some embodiments, the current pose is determined using sensors accessible by the waypoint cost block 440. In some embodiments, the current pose is received from an external device, e.g., odometry source 110 (FIG. 1). The waypoint cost block 440 is further configured to receive the waypoint pose 420. In some embodiments, the waypoint pose is received from a global planner, e.g., global planner 164 (FIG. 1). The waypoint cost block 430 is further configured to receive obstacle information 430. In some embodiments, the obstacle information 430 includes all known obstacles. In some embodiments, the obstacle information 430 only includes obstacles that pose a risk to the vehicle. For example, if an obstacle is located 5 meters above the ground and the vehicle is 2 meters tall, the obstacle is excluded from the obstacle information, in some embodiments, because the vehicle has no chance to collide with the obstacle 5 meters above the ground. In some embodiments, the obstacle information 430 is stored within a memory accessible by the waypoint cost block 440. In some embodiments, the obstacle information 430 is received from an external device, e.g., map server 140 (FIG. 1).

The waypoint cost block 440 includes a local path function block 450 configured to determine the cost of the waypoint based on a path from the current pose 410 to the waypoint pose 420. The local path function block 450 is configured to determine a path length ratio 452 based on a ratio between a direct path from the current pose 410 to the waypoint pose 420 and a calculated path from the current pose 410 to the waypoint pose. An example of determination of the path length ratio 452 is described with respect to FIG. 5.

Figure 5:
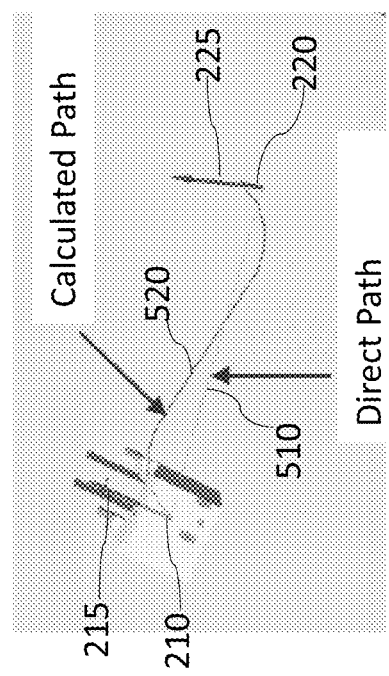
FIG. 5 is a schematic view of a ratio of a global path and a calculated path in accordance with some embodiments.

FIG. 5 is a schematic view of a ratio of a global path and a calculated path in accordance with some embodiments. FIG. 5 includes a vehicle at initial position 210 having initial orientation 215. FIG. 5 further includes destination position 220 and destination orientation 215. Since the waypoint under consideration is the destination for the waypoint cost block 440 (FIG. 4), the destination position 220 and the destination orientation 225 are the waypoint pose 420 (FIG. 4). FIG. 5 further includes a direct path 510 which extends in a straight line from the initial position 210 to the destination position 220. FIG. 5 further includes a calculated path 520 from the initial position 210 to the destination position 220.

The calculated path 520 is a calculated to estimate a route that the vehicle is likely to take to travel from the initial position 210 to the destination position 220. The inability of the vehicle to have zero turn radius reduce a likelihood that the vehicle will travel is a straight line from the initial position 210 to the destination position 220. Therefore, the calculated path 220 is a more realistic estimation of the travel route for the vehicle. In some embodiments, the calculated path is determined using a Reeds-Shepp curve. Reed-Shepp curves take into consideration a kinematic model association with non-holonomic vehicles. The Reed-Shepp curve shows a shortest path for a non-holonomic vehicle to travel between points. The current description is not limited to Reed-Shepp curves and is usable with any calculation method that is usable for non-holonomic vehicles to determine the calculated path 520. The path length ratio is a ratio of a length of the calculated path 520 to the direct path 510. As the ratio become smaller, a difference between the calculated path 520 and the direct path 510 is reduced. At a value of 1, the calculated path 520 is equal to the direct path 510.

Returning to FIG. 4, the local path function block 450 is further configured to determine an estimated number of direction changes 454 based on a difference between the current pose 410 and the waypoint pose 420. In some embodiments, the estimated number of direction changes 454 is further determined using a calculated path, e.g., calculated path 520 (FIG. 5). A direction change includes a switch from forward movement to reverse movement or reverse movement to forward movement. Turning, such as turning to the left or right, is not considered a direction change for the purpose of estimating the number of direction changes 454. As a number of direction changes increase, moving from the current pose 410 to the waypoint pose 420 becomes less efficient because more time is used during the movement and a distance traveled by the vehicle increases.

The waypoint cost block 440 further includes an orientation function block 460 configured to determination the cost of the waypoint based on changes in orientation from the current pose 410 to the waypoint pose 420. The orientation function block 460 is configured to determine a heading angle difference 462. Examples of determining heading angle differences are described with respect to FIGS. 6A-6D.

FIGS. 6A-6D are schematic views of a determination of a heading angle difference in accordance with some embodiments. The heading angle difference determined by a straight line connecting the current pose, e.g., current pose 410 (FIG. 4), and the waypoint pose, e.g., waypoint pose 420 (FIG. 4). In some embodiments, the straight line corresponds to the direct path 510 (FIG. 5). An angle between the initial orientation 215 and the straight line is used to determine the heading angle difference. An angle ranging from zero-degrees (0°) to less than ninety-degrees (90°) indicates forward motion by the vehicle is a favored movement direction. An angle ranging from greater than ninety-degrees (90°) to one hundred eighty-degrees (180°) indicates reverse motion by the vehicle is the favored movement direction. As the angle approaches ninety-degrees (90°), movement efficiency decreases and waypoint cost increases. As the angle approaches zero-degrees (0°) or one hundred eighty-degrees (180°), movement efficiency increases and the waypoint cost decreases. For an angle of exactly ninety-degree (90°), both forward and reverse movement are equally favored; and the chosen direction of motion is based on an orientation difference, obstacle positions, distance between the vehicle and obstacles, or other suitable parameters.

Figure 6A:
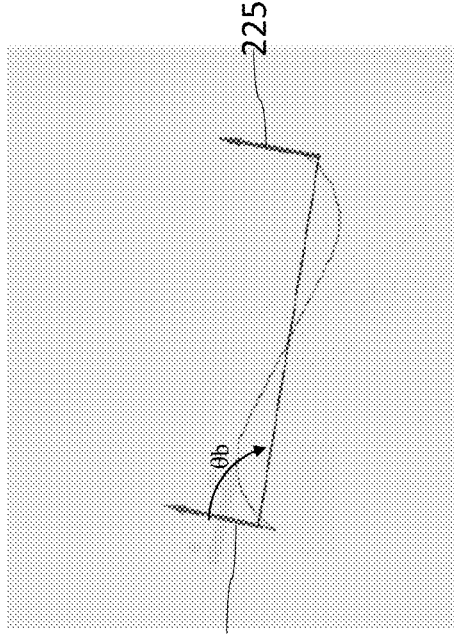
FIGS. 6A-6D are schematic views of a determination of a heading angle difference in accordance with some embodiments.

FIG. 6A is a schematic view 600A of a heading angle θa less than ninety-degrees (90°) in accordance with some embodiments. The heading angle θa is between the current pose, e.g., current pose 410 (FIG. 4), having initial orientation 215 and the straight line connected to the destination pose, e.g., destination pose 420 (FIG. 4), having destination orientation 225.

Figure 6B:
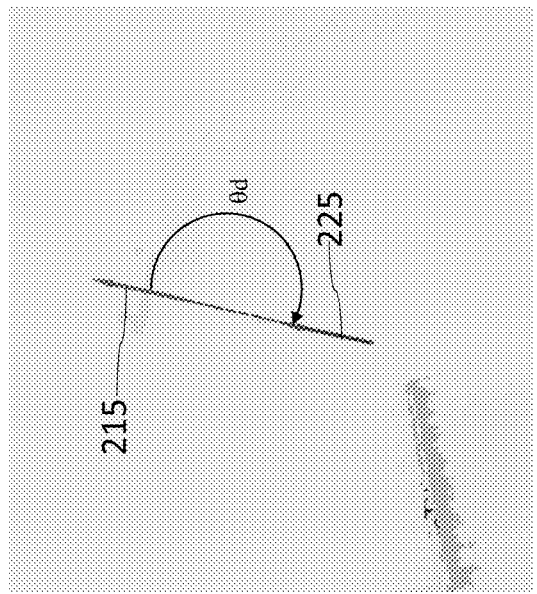

FIG. 6B is a schematic view 600B of a heading angle θb approximately equal to ninety-degrees (90°) in accordance with some embodiments. The heading angle θb is between the current pose, e.g., current pose 410 (FIG. 4), having initial orientation 215 and the straight line connected to the destination pose, e.g., destination pose 420 (FIG. 4), having destination orientation 225.

Figure 6C:
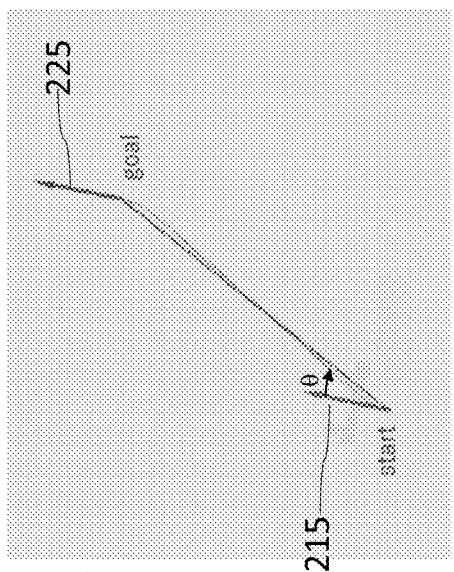

FIG. 6C is a schematic view 600C of a heading angle θc greater than ninety-degrees (90°) and less than one hundred eighty-degrees (180°) in accordance with some embodiments. The heading angle θc is between the current pose, e.g., current pose 410 (FIG. 4), having initial orientation 215 and the straight line connected to the destination pose, e.g., destination pose 420 (FIG. 4), having destination orientation 225.

Figure 6D:
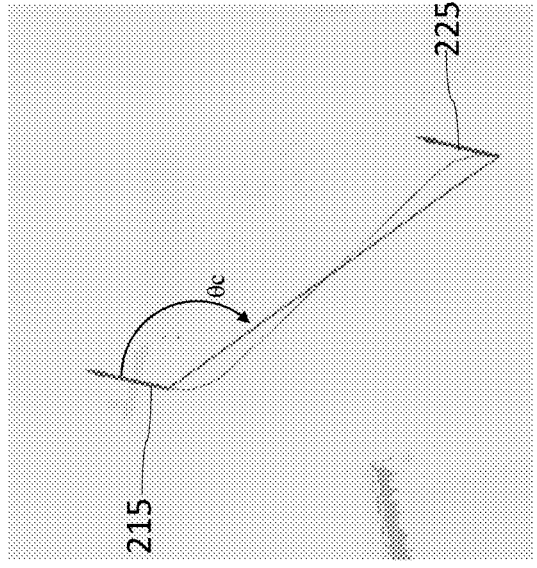

FIG. 6D is a schematic view 600D of a heading angle θd approximately equal to one hundred eighty-degrees (180°) in accordance with some embodiments. The heading angle θd is between the current pose, e.g., current pose 410 (FIG. 4), having initial orientation 215 and the straight line connected to the destination pose, e.g., destination pose 420 (FIG. 4), having destination orientation 225.

A waypoint cost associated with FIG. 6D is least among FIGS. 6A-6D. A waypoint cost associated with FIG. 6B is highest among FIGS. 6A-6D.

Returning to FIG. 4, the orientation function block 460 is further configured to determine an orientation difference 464. The orientation difference 464 is a difference between an orientation of the current pose 410 and an orientation of the waypoint pose 420. The orientation difference 464 is determined by calculating a first angle between the orientation of the current pose 410 and a first reference axis; and a second angle between the orientation of the waypoint pose 420 and a second reference axis extending parallel to the first reference axis. A difference between the first angle from the second angle corresponds to the orientation difference 464. As a difference between the first angle and the second angle decreases, efficiency of movement increases and waypoint cost is reduced. As a difference between the first angle and the second angle increases, efficiency of movement decrease and waypoint cost increases. A maximum difference between the first angle and the second angle is one hundred eighty-degrees (180°) and has a maximum waypoint cost. An example of determining an orientation difference 464 is proved in FIG. 7.

Figure 7:
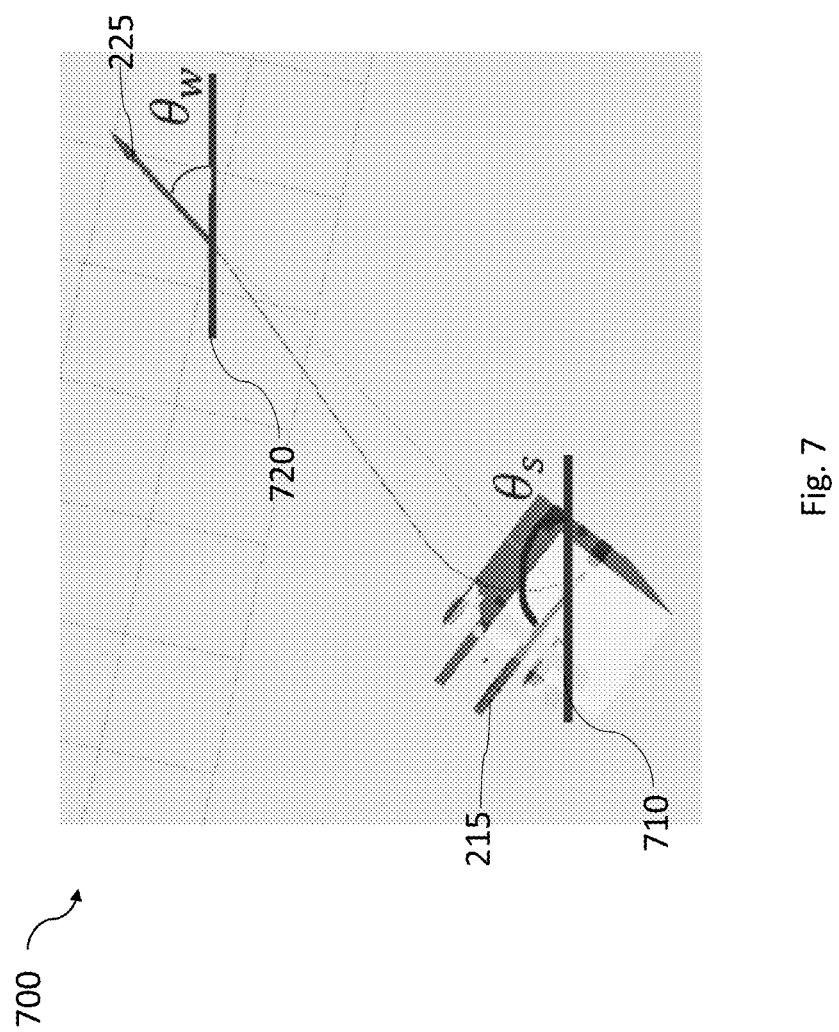
FIG. 7 is a schematic view of a determination of an orientation difference in accordance with some embodiments.

FIG. 7 is a schematic view 700 of a determination of an orientation difference in accordance with some embodiments. FIG. 7 includes initial orientation 215 corresponding to a current pose, e.g., current pose 410 (FIG. 4), and a first reference axis 710. A first angle θs is between the initial orientation 215 and the first reference axis 710. FIG. 7 further includes destination orientation 225 corresponding to a waypoint pose, e.g., waypoint pose 420 (FIG. 4), and a second reference axis 720. The second reference axis 720 is parallel to the first reference axis 710. A second angle θw is between the destination orientation 225 and the second reference axis 720. The orientation difference, e.g., orientation difference 464 (FIG. 4), is a difference between the first angle θs and the second angle θw.

Figure 8:
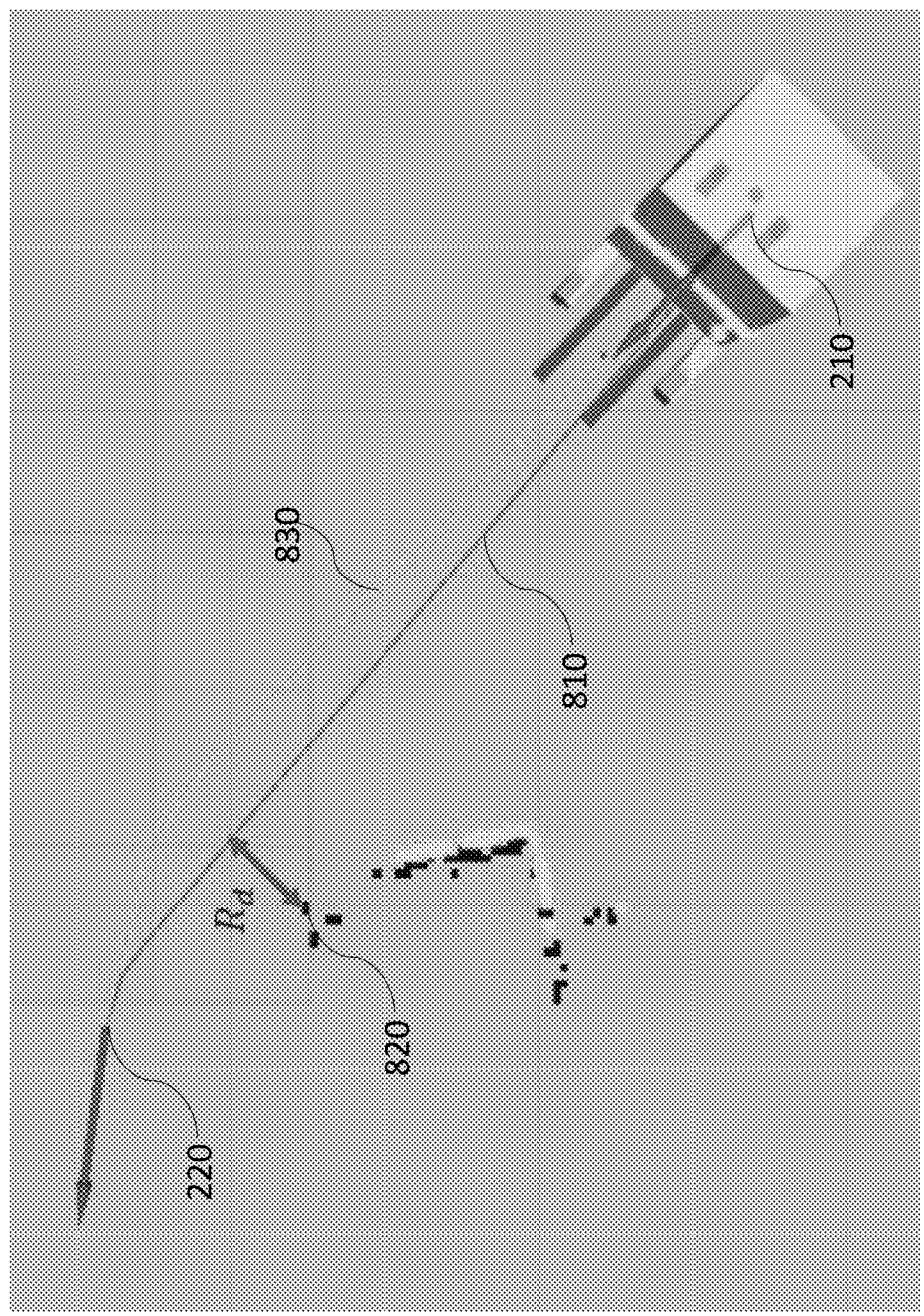
FIG. 8 is a schematic view of a determination of an obstacle proximity determination in accordance with some embodiments.

Returning to FIG. 4, the waypoint cost block 440 is further configured to determine an obstacle proximity 470. The waypoint cost block 440 determines the obstacle proximity 470 by generating a calculated path, e.g., calculated path 520 (FIG. 5) between the current pose 410 and the waypoint pose 420. The waypoint cost block 440 then determines a closest obstacle to the calculated path based on the obstacle information 430. A distance between the closest obstacle and the calculated path is determined as the obstacle proximity 470. As the distance between the closest obstacle and the calculated path decreases, the waypoint cost increases. In response to a determination that the closest obstacle overlaps the calculated path, the waypoint cost block 440 sets the waypoint cost to infinity and the waypoint under consideration is discarded. In some embodiments, the waypoint cost block 440 generates multiple calculated paths and the obstacle proximity 470 is determined for each of the calculated paths. FIG. 8 is an example of determination of obstacle proximity 470 in accordance with some embodiments.

FIG. 8 is a schematic view 800 of a determination of an obstacle proximity in accordance with some embodiments. FIG. 8 includes initial location 210 corresponding to a current pose, e.g., current pose 410 (FIG. 4); and destination location 220 corresponding to a waypoint pose, e.g., waypoint pose 420 (FIG. 4). A first calculated path 810 extends from the initial location 210 to the destination location 220. A closest obstacle 820 to the first calculated path 810 is identified based on obstacle information, e.g., obstacle information 430 (FIG. 4). A distance Rd between the closest obstacle 820 and the first calculated path 810 corresponds to the obstacle proximity, e.g., obstacle proximity 470 (FIG. 4). FIG. 8 further includes a second calculated path 830. In some embodiments, another obstacle proximity is calculated based on a distance between the closest object 820 and the second calculated path 830.

Returning to FIG. 4, the waypoint cost block 440 is further configured to determine a Euclidean distance 480 between the waypoint pose 420 and the current pose 410. The waypoint cost block 440 is configured to determine the Euclidean distance 480 by determining a length of a straight line between the current pose 410 and the waypoint pose 420. A waypoint cost associated with the Euclidean distance 480 is based on a comparison between a turning radius of the vehicle and the determined Euclidean distance 480. In some embodiments, if the Euclidean distance 480 is less than two-times the minimum turning radius of the vehicle, the waypoint is determined to have a higher cost; and if the Euclidean distance 480 is equal to or greater than two-times the minimum turning radius of the vehicle, the waypoint is determined to have a lower cost. The differences in the waypoint costs associated with the minimum turning radius of the vehicle is associated with reduced speed for performing turns with small radii.

The waypoint cost block 440 is configured to combine the waypoint costs determined by the local path function block 450, the orientation function block 460, the obstacle proximity 470 and the Euclidean distance 480 to determine a total waypoint cost using a formula block 490. The formula block 490 is configured to calculate the total waypoint cost based on coefficients associated with each component waypoint cost and adding the resulting values together. In some embodiments, the coefficients are individually determined based on an environment surrounding the vehicle, a number of obstacles in the obstacle information 430, regulations by a third party related to operation of the vehicle, user input, or other suitable criteria. In some embodiments, each of the coefficients are equal so that each component waypoint cost has a same impact on the total waypoint cost. In some embodiments, at least one coefficient is different from at least one other coefficient so that at least one component waypoint cost has a larger impact on the total waypoint cost than another component waypoint cost. In some embodiments, formula block 490 is configured to calculate the total waypoint cost using the following Equation (1):

$$\text{Cost} = a1 * NRS + a2 * \left(\frac{lc}{ld}\right) + a3 * |\theta diff| + a4 * \left|\left(\theta h - \frac{\pi}{2}\right)\right| + a5 * (d - dopt)^2 + a6 * Rd \qquad \text{EQ(1)}$$

where a1-a6 are coefficients of corresponding component waypoint costs, NRS is a number of direction changes 454, lc is a length of a calculated path, e.g., calculated path 520 (FIG. 5), ld is a length of a direct path, e.g., direct path 510 (FIG. 5), θdiff is an orientation difference 464, θh is a heading angle change, e.g., θa (FIG. 6A), d is a Euclidean distance 480, dopt is an optimal Euclidean distance, and Rd is an obstacle proximity 470. In some embodiments, dopt is determined based on density of obstacles in the map, a size of the vehicle, third part regulations or other suitable parameters.

The waypoint cost block 440 is configured to output the waypoint cost 495 for the waypoint under consideration. In some embodiments, the waypoint cost block 440 is configured to wirelessly transmit the waypoint cost 495. In some embodiments, the waypoint cost block 440 is configured to transmit the waypoint cost 495 by a wired connection. In some embodiments, the waypoint cost 495 is usable in the implementation of operation 310 or operation 330 of the method 300 (FIG. 3).

Figure 9:
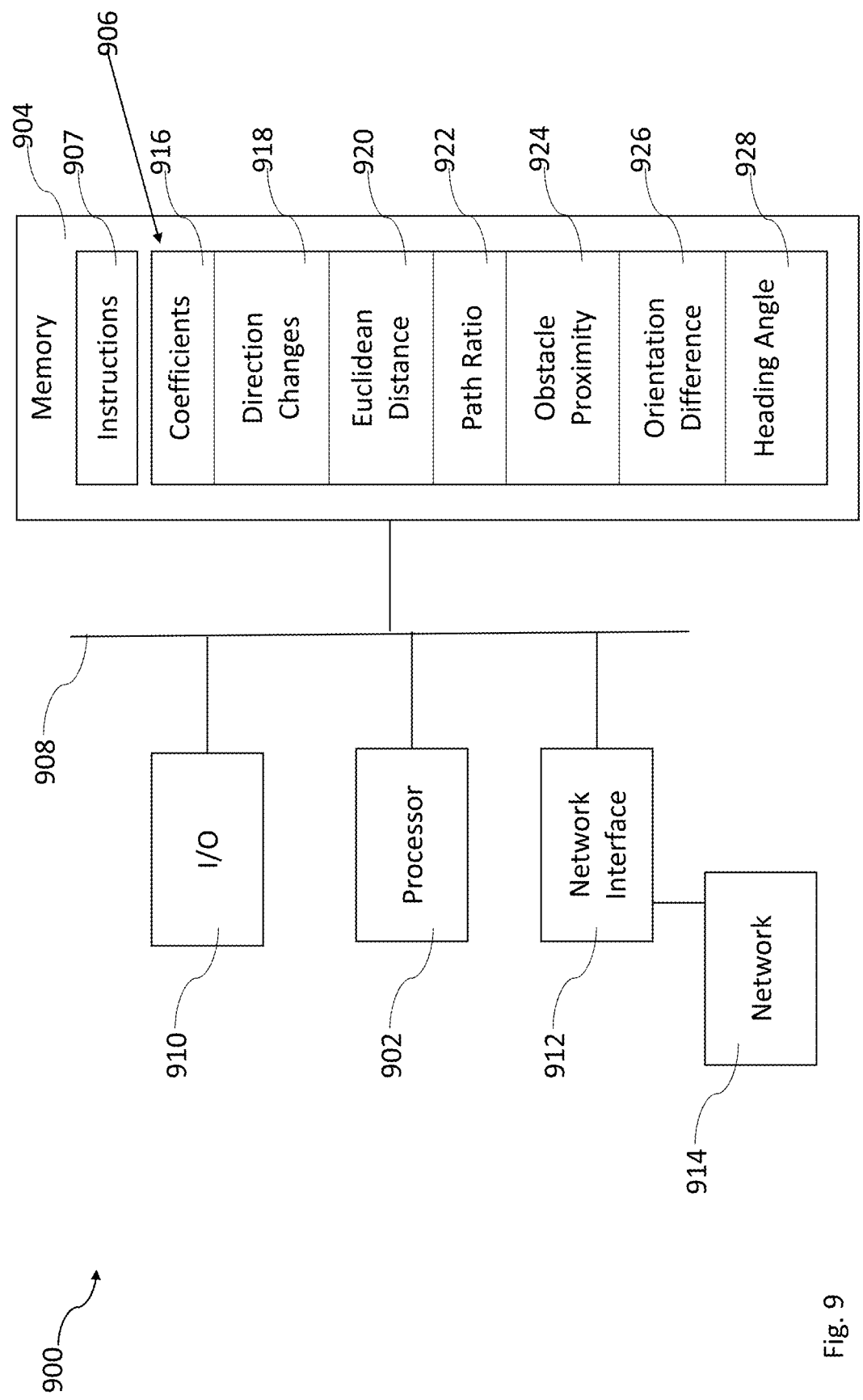
FIG. 9 is a block diagram of a system usable for a waypoint selection system in accordance with some embodiments.

FIG. 9 is a schematic view of a system 900 usable for selecting a waypoint in accordance with one or more embodiments. The system 900 is further capable of implementing a route determining system. System 900 includes a hardware processor 902 and a non-transitory, computer readable storage medium 904 encoded with, i.e., storing, the computer program code 906, i.e., a set of executable instructions. Computer readable storage medium 904 is also encoded with instructions 907 for interfacing with external devices. The processor 902 is electrically coupled to the computer readable storage medium 904 via a bus 908. The processor 902 is also electrically coupled to an I/O interface 910 by bus 908. A network interface 912 is also electrically connected to the processor 902 via bus 908. Network interface 912 is connected to a network 914, so that processor 902 and computer readable storage medium 904 are capable of connecting to external elements via network 914. The processor 902 is configured to execute the computer program code 906 encoded in the computer readable storage medium 904 in order to cause system 900 to be usable for performing a portion or all of the operations as described in route determining system 100 (FIG. 1), method 300 (FIG. 3), or waypoint selection system 400 (FIG. 4).

In some embodiments, the processor 902 is a central processing unit (CPU), a multi-processor, a distributed processing system, an application specific integrated circuit (ASIC), and/or a suitable processing unit.

In some embodiments, the computer readable storage medium 904 is an electronic, magnetic, optical, electromagnetic, infrared, and/or a semiconductor system (or apparatus or device). For example, the computer readable storage medium 904 includes a semiconductor or solid-state memory, a magnetic tape, a removable computer diskette, a random access memory (RAM), a read-only memory (ROM), a rigid magnetic disk, and/or an optical disk. In some embodiments using optical disks, the computer readable storage medium 904 includes a compact disk-read only memory (CD-ROM), a compact disk-read/write (CD-R/W), and/or a digital video disc (DVD).

In some embodiments, the storage medium 904 stores the computer program code 906 configured to cause system 900 to implement route determining system 100 (FIG. 1), method 300 (FIG. 3), or waypoint selection system 400 (FIG. 4). In some embodiments, the storage medium 904 also stores information needed for implementing route determining system 100 (FIG. 1), method 300 (FIG. 3), or waypoint selection system 400 (FIG. 4) as well as information generated during implementation of route determining system 100 (FIG. 1), method 300 (FIG. 3), or waypoint selection system 400 (FIG. 4), such as a coefficients parameter 916, a direction changes parameter 918, a Euclidean distance parameter 920, a path ratio parameter 922, an obstacle proximity parameter 924, an orientation difference parameter 926 and a heading angle parameter 928 and/or a set of executable instructions to perform the implementation of route determining system 100 (FIG. 1), method 300 (FIG. 3), or waypoint selection system 400 (FIG. 4).

In some embodiments, the storage medium 904 stores instructions 907 for interfacing with external devices. The instructions 907 enable processor 902 to generate manufacturing instructions readable by the external devices to effectively implement route determining system 100 (FIG. 1), method 300 (FIG. 3), or waypoint selection system 400 (FIG. 4).

System 900 includes I/O interface 910. I/O interface 910 is coupled to external circuitry. In some embodiments, I/O interface 910 includes a keyboard, keypad, mouse, trackball, trackpad, and/or cursor direction keys for communicating information and commands to processor 902.

System 900 also includes network interface 912 coupled to the processor 902. Network interface 912 allows system 900 to communicate with network 914, to which one or more other computer systems are connected. Network interface 912 includes wireless network interfaces such as BLUETOOTH, Wireless Fidelity (WIFI), Worldwide Interoperability for Microwave Access (WIMAX), General Packet Radio Service (GPRS), or Wideband Code Division Multiple Access (WCDMA); or wired network interface such as ETHERNET, Universal Serial Bus (USB), or IEEE-1394 (Institute of Electrical and Electronics Engineers-1394). In some embodiments, implementation of route determining system 100 (FIG. 1), method 300 (FIG. 3), or waypoint selection system 400 (FIG. 4) occurs in two or more systems 900, and information, such a coefficients parameter 916, a direction changes parameter 918, a Euclidean distance parameter 920, a path ratio parameter 922, an obstacle proximity parameter 924, an orientation difference parameter 926 and a heading angle parameter 928 are exchanged between different systems 900 via network 914.

Supplemental Note

An aspect of this description relates to a waypoint selection system. The waypoint selection system includes a non-transitory computer readable medium configured to store instructions thereon. The waypoint selection system further includes a processor connected to the non-transitory computer readable medium. The processor is configured to execute the instructions for obtaining information related to a current pose of a vehicle. The processor is further configured to execute the instructions for obtaining a plurality of waypoints between the current pose of the vehicle and a destination pose. The processor is further configured to execute the instructions for obtaining obstacle information. The processor is further configured to execute the instructions for determining a first waypoint cost for a first waypoint of the plurality of waypoints. The processor is further configured to execute the instructions for selecting the first waypoint in response to the first waypoint cost satisfying a predetermined condition. The processor is further configured to execute the instructions for outputting the selected first waypoint and all waypoints of the plurality of waypoints between the first waypoint and the current pose to a controller in response to selecting of the first waypoint.

In some embodiments, the processor is further configured to execute the instructions for determining a waypoint cost for each of the plurality of waypoints.

In some embodiments, the processor is further configured to execute the instructions for selecting the first waypoint in response to the first waypoint cost being a lowest waypoint cost of all waypoint costs for the plurality of waypoints.

In some embodiments, the processor is further configured to execute the instructions for selecting the first waypoint in response to the first waypoint cost being less than a predetermined waypoint cost threshold value.

In some embodiments, the processor is further configured to execute the instructions for determining a second waypoint cost for a second waypoint of the plurality of waypoints in response to a determination that the first waypoint cost is equal to or greater than the predetermined waypoint cost threshold value.

In some embodiments, the processor is further configured to execute the instructions generating a path from the current pose to the pose at the first waypoint in response to selecting the first waypoint.

In some embodiments, the processor is further configured to execute the instructions for determining the first waypoint cost based on: a path length ratio between (1) a direct path between the current pose and a pose at the first waypoint and (2) a calculated path between the current pose and the pose at the first waypoint; a number of direction changes along the calculated path between the current pose and the pose at the first waypoint; a heading angle from the current pose to the pose at the first waypoint; an orientation difference between the current pose and the pose at the first waypoint; a proximity of a closest obstacle to the calculated path; and a Euclidean distance between the current pose and the pose at the first waypoint.

An aspect of this description further relates to a waypoint selection method. The method includes obtaining information related to a current pose of a vehicle. The method further includes obtaining a plurality of waypoints between the current pose of the vehicle and a destination pose. The method further includes obtaining obstacle information. The method further includes determining a first waypoint cost for a first waypoint of the plurality of waypoints. The method further includes selecting the first waypoint in response to the first waypoint cost satisfying a predetermined condition. The method further includes outputting the selected first waypoint and all waypoints of the plurality of waypoints between the first waypoint and the current pose to a controller in response to selecting of the first waypoint.

In some embodiments, determining the first waypoint cost includes determining a waypoint cost for each of the plurality of waypoints.

In some embodiments, selecting the first waypoint includes selecting the first waypoint in response to the first waypoint cost being a lowest waypoint cost of all waypoint costs for the plurality of waypoints.

In some embodiments, selecting the first waypoint includes selecting the first waypoint in response to the first waypoint cost being less than a predetermined waypoint cost threshold value.

In some embodiments, the method further includes determining a second waypoint cost for a second waypoint of the plurality of waypoints in response to a determination that the first waypoint cost is equal to or greater than the predetermined waypoint cost threshold value.

In some embodiments, the method further includes generating a path from the current pose to the pose at the first waypoint in response to selecting the first waypoint.

In some embodiments, determining the first waypoint cost includes determining the first waypoint cost based on: a path length ratio between (1) a direct path between the current pose and a pose at the first waypoint and (2) a calculated path between the current pose and the pose at the first waypoint; a number of direction changes along the calculated path between the current pose and the pose at the first waypoint; a heading angle from the current pose to the pose at the first waypoint; an orientation difference between the current pose and the pose at the first waypoint; a proximity of a closest obstacle to the calculated path; and a Euclidean distance between the current pose and the pose at the first waypoint.

An aspect of this description relates to a vehicle control system. The vehicle control system includes a non-transitory computer readable medium configured to store instructions thereon. The vehicle control system further includes a processor connected to the non-transitory computer readable medium. The processor is configured to execute the instructions for obtaining information related to a current pose of a vehicle. The processor is further configured to execute the instructions for obtaining a destination pose. The processor is further configured to execute the instructions for obtaining obstacle information. The processor is further configured to execute the instructions for obtaining information related to surroundings of the vehicle. The processor is further configured to execute the instructions for determining a plurality of waypoints between the current pose and the destination pose. The processor is further configured to execute the instructions for determining a first waypoint cost for a first waypoint of the plurality of waypoints. The processor is further configured to execute the instructions for selecting the first waypoint in response to the first waypoint cost satisfying a predetermined condition. The processor is further configured to execute the instructions for generating a path between the current pose and a pose at the first waypoint in response to selecting the first waypoint. The processor is further configured to execute the instructions for outputting the selected first waypoint and the generated path to a controller in response to selecting of the first waypoint.

In some embodiments, the processor is further configured to execute the instructions for determining a waypoint cost for each of the plurality of waypoints.

In some embodiments, the processor is further configured to execute the instructions for selecting the first waypoint in response to the first waypoint cost being a lowest waypoint cost of all waypoint costs for the plurality of waypoints.

In some embodiments, the processor is further configured to execute the instructions for selecting the first waypoint in response to the first waypoint cost being less than a predetermined waypoint cost threshold value.

In some embodiments, the processor is further configured to execute the instructions for determining the first waypoint cost based on: a path length ratio between (1) a direct path between the current pose and a pose at the first waypoint and (2) a calculated path between the current pose and the pose at the first waypoint; a number of direction changes along the calculated path between the current pose and the pose at the first waypoint; a heading angle from the current pose to the pose at the first waypoint; an orientation difference between the current pose and the pose at the first waypoint; a proximity of a closest obstacle to the calculated path; and a Euclidean distance between the current pose and the pose at the first waypoint.

In some embodiments, the vehicle control system further includes the controller, wherein the controller is configured to generate instructions for movements of the vehicle from the current pose to the pose at the first waypoint; and transmit the instructions for movements to the vehicle.

An aspect of this description relates to a controller. The controller includes a non-transitory computer readable medium configured to store instructions thereon. The controller further includes a processor connected to the non-transitory computer readable medium. The processor is configured to execute the instructions for obtaining information related to a current pose of a vehicle; obtaining a destination pose; obtaining obstacle information; and obtaining information related to surroundings of the vehicle. The processor is further configured to execute the instructions for determining a plurality of waypoints between the current pose and the destination pose. The processor is further configured to execute the instructions for determining a first waypoint cost for a first waypoint of the plurality of waypoints. The processor is further configured to execute the instructions for selecting the first waypoint in response to the first waypoint cost satisfying a predetermined condition. The processor is further configured to execute the instructions for generating a path between the current pose and a pose at the first waypoint in response to selecting the first waypoint. The processor is further configured to execute the instructions for outputting movement instructions to the vehicle for moving along the generated path in response to selecting of the first waypoint.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A waypoint selection system comprising:
a non-transitory computer readable medium configured to store instructions thereon; and
a processor connected to the non-transitory computer readable medium, wherein the processor is configured to execute the instructions for:
obtaining information related to a current pose of a vehicle including a combination of location and orientation relative to a reference axis;
obtaining information related to a destination pose of the vehicle including a combination of location and orientation relative to the reference axis;
obtaining a plurality of waypoints between the orientation of the vehicle at the location indicated by the current pose and the orientation of the vehicle at the location indicated by the destination pose;
obtaining obstacle information;
determining a first waypoint cost for a first waypoint, corresponding to an amount of movement for the vehicle to move from the orientation of the vehicle at the location indicated by the current pose to the orientation of the vehicle at the first waypoint, of the plurality of waypoints;
selecting the first waypoint in response to the first waypoint cost satisfying a predetermined condition;
generating a path from the current pose to the pose at the first waypoint in response to selecting the first waypoint;
outputting movement instructions to the vehicle for moving along the generated path;
wherein the processor is further configured to execute the instructions for determining the first waypoint cost based on:
a path length ratio between (1) a direct path between the current pose and a pose at the first waypoint and (2) a calculated path between the current pose and the pose at the first waypoint;
a number of direction changes along the calculated path between the current pose and the pose at the first waypoint;
a heading angle from the current pose to the pose at the first waypoint;
an orientation difference between the current pose and the pose at the first waypoint, with the waypoint cost increasing as it approaches ninety degrees and decreasing as it approaches zero degrees or one hundred eighty degrees;
a proximity of a closest obstacle to the calculated path; and
a Euclidean distance between the current pose and the pose at the first waypoint.

2. The waypoint selection system according to claim 1, wherein the processor is further configured to execute the instructions for determining the waypoint cost for each of the plurality of waypoints.

3. The waypoint selection system according to claim 2, wherein the processor is further configured to execute the instructions for selecting the first waypoint in response to the first waypoint cost being a lowest waypoint cost of all waypoint costs for the plurality of waypoints.

4. The waypoint selection system according to claim 1, wherein the processor is further configured to execute the instructions for selecting the first waypoint in response to the first waypoint cost being less than a predetermined waypoint cost threshold value.

5. The waypoint selection system according to claim 4, wherein the processor is further configured to execute the instructions for determining a second waypoint cost for a second waypoint of the plurality of waypoints in response to a determination that the first waypoint cost is equal to or greater than the predetermined waypoint cost threshold value.

6. A waypoint selection method comprising:
obtaining information related to a current pose of a vehicle including a combination of location and orientation relative to a reference axis;
obtaining information related to a destination pose of the vehicle including a combination of location and orientation relative to the reference axis;
obtaining a plurality of waypoints between the orientation of the vehicle at the location indicated by the current pose and the orientation of the vehicle at the location indicated by the destination pose;
obtaining obstacle information;
determining a first waypoint cost for a first waypoint, corresponding to an amount of movement for the vehicle to move from the orientation of the vehicle at the location indicated by the current pose to the orientation of the vehicle at the first waypoint, of the plurality of waypoints;
selecting the first waypoint in response to the first waypoint cost satisfying a predetermined condition;
generating a path from the current pose to the pose at the first waypoint in response to selecting the first waypoint;
outputting movement instructions to the vehicle for moving along the generated path: wherein determining the first waypoint cost comprising determining the first waypoint cost based on:
a path length ratio between (1) a direct path between the current pose and a pose at the first waypoint and (2) a calculated path between the current pose and the pose at the first waypoint;
a number of direction changes along the calculated path between the current pose and the pose at the first waypoint;
a heading angle from the current pose to the pose at the first waypoint;
an orientation difference between the current pose and the pose at the first waypoint, with the waypoint cost increasing as it approaches ninety degrees and decreasing as it approaches zero degrees or one hundred eighty degrees;
a proximity of a closest obstacle to the calculated path; and
a Euclidean distance between the current pose and the pose at the first waypoint.

7. The waypoint selection method according to claim 6, further comprising determining the waypoint cost for each of the plurality of waypoints.

8. The waypoint selection method according to claim 7, wherein selecting the first waypoint comprises selecting the first waypoint in response to the first waypoint cost being a lowest waypoint cost of all waypoint costs for the plurality of waypoints.

9. The waypoint selection method according to claim 6, wherein selecting the first waypoint comprises selecting the first waypoint in response to the first waypoint cost being less than a predetermined waypoint cost threshold value.

10. The waypoint selection method according to claim 9, further comprising determining a second waypoint cost for a second waypoint of the plurality of waypoints in response to a determination that the first waypoint cost is equal to or greater than the predetermined waypoint cost threshold value.

11. A vehicle control system comprising:
a non-transitory computer readable medium configured to store instructions thereon; and
a processor connected to the non-transitory computer readable medium, wherein the processor is configured to execute the instructions for:
obtaining information related to a current pose of a vehicle including a combination of location and orientation relative to a reference axis;
obtaining information related to a destination pose of the vehicle including a combination of location and orientation relative to the reference axis;
obtaining obstacle information;
obtaining information related to surroundings of the vehicle;
determining a plurality of waypoints between the orientation of the vehicle at the location indicated by the current pose and the orientation of the vehicle at the location indicated by the destination pose;
determining a first waypoint cost for a first waypoint, corresponding to an amount of movement for the vehicle to move from the orientation of the vehicle at the location indicated by the current pose to the orientation of the vehicle at the first waypoint, of the plurality of waypoints;
selecting the first waypoint in response to the first waypoint cost satisfying a predetermined condition;
generating a path between the current pose and a pose at the first waypoint in response to selecting the first waypoint; and
outputting the selected first waypoint and the generated path to a controller in response to selecting of the first waypoint,
wherein the processor is further configured to execute the instructions for determining the first waypoint cost based on:
a path length ratio between (1) a direct path between the current pose and a pose at the first waypoint and (2) a calculated path between the current pose and the pose at the first waypoint;
a number of direction changes along the calculated path between the current pose and the pose at the first waypoint;
a heading angle from the current pose to the pose at the first waypoint;
an orientation difference between the current pose and the pose at the first waypoint, with the waypoint cost increasing as it approaches ninety degrees and decreasing as it approaches zero degrees or one hundred eighty degrees;
a proximity of a closest obstacle to the calculated path; and
a Euclidean distance between the current pose and the pose at the first waypoint, wherein the vehicle control system further comprises the controller, the controller is configured to:
generate instructions for movements of the vehicle from the current pose to the pose at the first waypoint; and
transmit the instructions for movements to the vehicle.

12. The vehicle control system according to claim 11, wherein the processor is further configured to execute the instructions for determining the waypoint cost for each of the plurality of waypoints.

13. The vehicle control system according to claim 12, wherein the processor is further configured to execute the instructions for selecting the first waypoint in response to the first waypoint cost being a lowest waypoint cost of all waypoint costs for the plurality of waypoints.

14. The vehicle control system according to claim 11, wherein the processor is further configured to execute the instructions for selecting the first waypoint in response to the first waypoint cost being less than a predetermined waypoint cost threshold value.

15. A controller comprising:
a non-transitory computer readable medium configured to store instructions thereon; and
a processor connected to the non-transitory computer readable medium, wherein the processor is configured to execute the instructions for:
obtaining information related to a current pose of a vehicle including a combination of location and orientation relative to a reference axis;
obtaining information related to a destination pose of the vehicle including a combination of location and orientation relative to the reference axis;
obtaining obstacle information;
obtaining information related to surroundings of the vehicle;
determining a plurality of waypoints between the orientation of the vehicle at the location indicated by the current pose and the orientation of the vehicle at the location indicated by the destination pose;
determining a first waypoint cost for a first waypoint, corresponding to an amount of movement for the vehicle to move from the orientation of the vehicle at the location indicated by the current pose to the orientation of the vehicle at the first waypoint, of the plurality of waypoints;
selecting the first waypoint in response to the first waypoint cost satisfying a predetermined condition;
generating a path between the current pose and a pose at the first waypoint in response to selecting the first waypoint;
outputting movement instructions to the vehicle for moving along the generated path in response to selecting of the first waypoint,
wherein the processor is further configured to execute the instructions for determining the first waypoint cost based on:
a path length ratio between (1) a direct path between the current pose and a pose at the first waypoint and (2) a calculated path between the current pose and the pose at the first waypoint;
a number of direction changes along the calculated path between the current pose and the pose at the first waypoint;
a heading angle from the current pose to the pose at the first waypoint;
an orientation difference between the current pose and the pose at the first waypoint, with the waypoint cost increasing as it approaches ninety degrees and decreasing as it approaches zero degrees or one hundred eighty degrees;
a proximity of a closest obstacle to the calculated path; and
a Euclidean distance between the current pose and the pose at the first waypoint.

* * * * *